United States Patent [19]
Cassidy et al.

[11] Patent Number: 5,661,374
[45] Date of Patent: Aug. 26, 1997

[54] LED LIGHT STRIP WITH BRIGHTNESS/ CURRENT DRAW CONTROL CIRCUITRY

[75] Inventors: Robert E. Cassidy, Lebanon; Douglas J. Livingston, Wilmot Flat, both of N.H.

[73] Assignee: Astronics Corporation, East Aurora, N.Y.

[21] Appl. No.: 698,482

[22] Filed: Aug. 15, 1996

Related U.S. Application Data

[63] Continuation of Ser. No. 355,727, Dec. 14, 1994, abandoned.

[51] Int. Cl.$^6$ ........................................... H05B 37/02
[52] U.S. Cl. .................... 315/307; 315/291; 315/185 R; 315/312; 323/273; 323/265; 323/292; 362/800
[58] Field of Search ........................ 362/391, 249, 362/800, 219, 153; 323/254, 266, 292, 269, 902, 273, 272, 265; 315/291, 307, 121, 122, 185 R, 312

[56] References Cited

U.S. PATENT DOCUMENTS

| | | |
|---|---|---|
| 3,755,663 | 8/1973 | George, Jr. . |
| 4,104,555 | 8/1978 | Fleming .................. 313/512 |
| 4,143,297 | 3/1979 | Fischer ..................... 313/502 |
| 4,159,559 | 7/1979 | Robinson, Sr. ........... 445/35 |
| 4,608,308 | 8/1986 | Igarashi et al. .......... 428/408 |
| 4,631,650 | 12/1986 | Ahroni ..................... 362/249 |
| 4,654,765 | 3/1987 | Laidman ................... 362/238 |
| 4,661,373 | 4/1987 | Kato et al. ................ 427/66 |
| 4,719,405 | 1/1988 | Boucher ................... 323/902 X |
| 4,994,944 | 2/1991 | Vernondier ............... 362/238 |
| 5,051,654 | 9/1991 | Nativi et al. .............. 313/506 |
| 5,144,117 | 9/1992 | Hasegawa et al. ....... 362/800 X |

FOREIGN PATENT DOCUMENTS

| | | |
|---|---|---|
| 0 323 217 A1 | 7/1989 | European Pat. Off. . |
| WO 88/04467 | 6/1988 | WIPO . |
| WO 92/14092 | 8/1992 | WIPO . |

*Primary Examiner*—Robert Pascal
*Assistant Examiner*—Arnold Kinkead
*Attorney, Agent, or Firm*—Steven J. Hultquist

[57] ABSTRACT

A current consumption control system for controlling the current draw of an electric power-consuming device, e.g., a modular strip lighting unit for a lighting system including at least one said unit, in which the strip lighting unit includes at least one light source element operatively coupled to a lighting circuit. The lighting circuit may illustratively comprise at least one pair of primary conduction lines connectable to a voltage source, and coupled in electrical circuit relationship with a current regulating circuit. The current regulating circuit includes an operational amplifier which is coupled with the primary conduction lines to generate a reference voltage, and which is coupled with positve and negative current input lines, with at least one power-consuming device coupled to the current output of the operational amplifier, and to the negative current input line. In such arrangement, the operational amplifier compares (i) the reference voltage to (ii) the voltage differential between the positive current input and the negative current input of the operational amplifier, and responsively adjusts current at the current output of the operational amplifier to the power-consuming element, to maintain a selected power consumption level by the electrical power-consuming element, independent of the input voltage across the primary conduction lines.

24 Claims, 3 Drawing Sheets

LED LIGHT STRIP WITH BRIGHTNESS/ CURRENT DRAW CONTROL CIRCUITRY

This is a continuation of U.S. application No. 08/355,727 filed Dec. 14, 1994 now abandoned.

BACKGROUND OF THE INVENTION

1. Field of the Invention

This invention broadly relates in one aspect to strip lighting systems of a type comprising connectable unitary modular strip lighting assemblies, as employed to provide illumination in a wide variety of industrial, commercial, and consumer applications. In another broad aspect, the present invention relates to a current-regulating circuit for maintaining current draw of an electrical power-consuming device at a predetermined current consumption level, even when the voltage supplied to the device undergoes fluctuation or oscillation.

2. Description of the Related Art

Linear lighting systems of the type known in the art as strip lighting systems, have been in extensive conventional use.

One configurational type of such strip lighting systems comprise modular strip lighting units including an elongate casing, generally in the form of an extruded tubular housing of resilient, translucent or transparent material (e.g. plastic tubing). Within the extruded tubular housing is a sequence of spaced-apart bulbs or other light emitting sources (such as LEDs, incandescent bulbs, or other electroluminescent lamps) in series and/or parallel relationship with one another. Strip lighting units of such illumination systems are thus provided in a unitary modular form, with the respective lighting units being interconnectable with one another, in series and/or parallel relationship, to form multi-unit extended lighting system assemblies for illumination of a specific environment or locus.

Another structural type of strip lighting system comprises an electroluminescent lamp including a layer of electroluminescent phosphor material, e.g., a metal activated zinc sulfide, which is fixedly positioned by a polymer binder between two conductive layers. One of the conductive layers is transparent. In such assembly, the application of an alternating electric field across the conductors causes the phosphors to become excited and emit electrons in the visible light spectrum.

In parallel relationship arrangements of interconnected strip lighting units, means are provided for electrical communication of the illumination elements, usually disposed in serial relationship to one another in the interior of the housing of the strip lighting unit, with an exterior, and often remote, electrical (voltage) source, as well as with other strip lighting units. Such electrical communication is typically effected by means of positive and negative conduction paths within the strip lighting unit. The positive and negative conduction paths may be suitably coupled, e.g., co-linearly or coaxially, with an electrical connection line forming a connection between the positive and the negative conduction paths within the strip lighting unit. Multiple modular light strip units thereby form a complex circuit of individually serial light sources grouped into strips which are in parallel relation to one another (providing a so-called "series/parallel" arrangement of the light source elements in the illumination system).

In series relationship arrangements of interconnected strip lighting units, each unit includes a simple series of connected light sources. The connection of successive units in the array is also in series, thereby simply extending a single conduction path.

The resulting array of modular strip lighting unit(s) is disposed at a selected position in the specific environment or locus of use. For example, a length of the strip lighting assembly formed by an end-to-end series-connected plurality of strip lighting units, may be provided in a non-slip nosing structure extending across the front edges of steps of a staircase, or mounted along a handrail or at the intersection of a wall and the floor in a hallway, thereby defining a directional path or boundary demarcation means. Another example is the provision of an illuminated path provided along the aisle and exits of an aircraft in the event of an emergency. A wide variety of decorative and safety-enhancement uses for such strip lighting systems exists. Further, when the housings of the individual component strip lighting units in the assembly are of a deformable and flexible character, holding their shape and conformation as deformed, the resulting strip lighting assembly may advantageously be utilized in non-linear deployment applications, in which the "line" of the originally interconnected strip lighting modular units may be bent or deformed to a desired curvature or other non-linear conformation at the locus of use.

Although strip lighting systems of the aforementioned general type have been widely and successfully commercialized, such systems nonetheless suffer from various associated deficiencies which have limited their utility and applicability, as described more fully below.

Individual light source (illumination) elements in strip lighting systems are generally highly sensitive to variations of input voltage to the strip lighting modular unit containing such light source elements. In both parallel and the series arrangements of strip lighting units in multi-unit system arrays, the failure of individual light source elements (generating either short circuits or open circuits) cause unsatisfactory fluctuations in voltage across the remaining light sources, often of a sufficient magnitude to render the unit at least partially inoperative.

Open circuit failures in a series arrangement of strip lighting modules will break the circuit completely, and result in illumination failure.

In previous strip lighting system designs of the series/parallel type (which is the most popular), the provision of different numbers of multiple strip lighting units in respective (parallel) branches of the strip lighting system, in which each strip lighting unit is identically constructed in relation to the others in the system, and/or the provision of differently sized strip lighting units in the branches of the strip lighting system, results in differing numbers of light source elements in the respective branches, and causes a differing total resistivity to be present in the respective branches.

In the case where differently sized strip lighting units are provided, the longer length strip lighting units (with more light source elements) generally draw more current than the shorter length strip lighting units (with less light source elements) in a parallel relationship, and the longer length strip lighting units therefore generate more intense light than the shorter lengths of otherwise identically constructed strip lighting modular units.

Correspondingly, the provision of different numbers of multiple strip lighting units in respective (parallel) branches of the strip lighting system, in which each strip lighting unit is identically constructed in relation to the others in the system, provides branches containing different numbers of light source elements, and the branches containing the larger numbers of light source elements likewise draw more current than the branches containing smaller numbers of light source elements, and the former branches containing more light source elements therefore generate more intense light than the latter branches containing less light source elements.

U.S. Pat. No. 5,107,408 teaches one solution to this incompatibility problem, wherein during installation, and prior to operation, of a strip lighting system composed of modular assembly strip lighting elements, resistors of predetermined value are positioned in series with the light source elements of each individual modular strip lighting unit, to balance the voltage drop across each unit to a predetermined or selected voltage drop value. Such a passively (or statically) balanced strip lighting system, however, does not have the ability to maintain a constant voltage across each light source when either the true input voltage varies or when an individual light source element fails.

Accordingly, it would be a significant advance in the art, and is correspondingly an object of the present invention, to provide a strip lighting system, and modular strip lighting units therefor, which overcome the aforementioned deficiencies of the prior art.

More specifically, it is one object of the present invention to provide a strip lighting system which is operable to maintain substantially uniform brightness of illumination across the full extent of the lighting array comprising multiple light source elements, even when the input voltage to the strip lighting system experiences fluctuations or time variation in the magnitude of the voltage, and even when individual light source elements fail in the lighting array.

It is another object of the present invention to provide a strip lighting modular unit for such an array, with such uniform current draw and brightness characteristics.

It is a further object of the invention to provide a current draw and brightness control circuit having utility in such strip lighting systems and modular units therefor.

It is still another object of the present invention to provide a current draw control circuit which is usefully employed to control the current consumption of an electrical power consuming device.

Various other objects, advantages and improvements of the present invention will be more fully apparent from the ensuing disclosure and appended claims.

SUMMARY OF THE INVENTION

The present invention relates in one aspect to a current consumption control circuit for an electrical power consuming device including at least one pair of primary conduction lines connectable to a voltage source for maintaining a voltage differential between such pair of primary conduction lines, one line of such pair therein being a positive primary conduction line and the other line of such pair being a negative primary conduction line, with the positive primary conduction line and the negative primary conduction line being coupled in electrical circuit relationship to the current consumption control circuit and to at least one electric power-consuming element.

More specifically, such current consumption control circuit in one aspect comprises:

an operational amplifier including a positive reference voltage input, a negative reference voltage input, a positive current input, a negative current input, and a current output;

a positive reference voltage input line joining the positive reference voltage input of the operational amplifier with the positive primary conduction line;

a negative reference voltage input line joining the negative reference voltage input of the operational amplifier with the negative primary conduction line;

a postive current input line comprising at least one resistor and joining the positive current input of the operational amplifier to the positive primary conduction line;

a negative current input line comprising at least one resistor and joining the negative current input of the operational amplifier to the negative primary conduction line, and at least one output conduction line coupled to at least one electric power-consuming dement and having first and second ends, with the first end of the output conduction line being joined to the current output of the operational amplifier, and with the second end of the output conduction line being joined to the negative current input line;

wherein the operational amplifier is constructed and arranged to compare (i) a reference voltage differential between the positive reference voltage input and the negative reference voltage input of the operational amplifier, to (ii) the voltage differential between the positive current input and the negative current input of the operational amplifier, and to responsively adjust current from the current output of said operational amplifier to the output conduction line to maintain a selected current consumption level from the at least one electric power-consuming element independent of input voltage across the pair of primary conduction lines.

The present invention relates in another aspect to a strip lighting system of the type comprising connectable unitary modular strip lighting subassemblies which are connectable in series and/or parallel relationship to form a multi-unit illumination system, wherein a current consumption control circuit is employed to regulate the current drawn by illumination source elements in the system.

In one particular aspect, the invention contemplates a control circuit for controllably maintaining brightness of output illumination from a strip lighting system at a selected uniform level by control of the current draw of the illumination elements in the strip lighting system with which the control circuit is deployed.

In another specific aspect, the present invention relates to a modular strip lighting unit constructed and arranged for use in a lighting system including at least one such unit. The strip lighting unit includes at least one light source element operatively coupled to a lighting circuit, in which the lighting circuit comprises at least one pair of primary conduction lines connectable to a voltage source for maintaining a voltage differential between such pair of primary conduction lines, one line of such pair therein being a positive primary conduction line and the other line of such pair being a negative primary conduction line, with the positive primary conduction line and the negative primary conduction line being coupled in electrical circuit relationship to a current regulating circuit. The current regulating circuit may suitably comprise:

an operational amplifier including a positive reference voltage input, a negative reference voltage input, a positive current input, a negative current input, and a current output;

a positive reference voltage input line joining the positive reference voltage input of the operational amplifier with the positive primary conduction line;

a negative reference voltage input line joining the negative reference voltage input of the operational amplifier with the negative primary conduction line;

a postive current input line comprising at least one resistor and joining the positive current input of the operational amplifier to the positive primary conduction line;

a negative current input line comprising at least one resistor and joining the negative current input of the operational amplifier to the negative primary conduction line, and at least one light source conduction line coupled to at least one light source element and having first and second ends, with the first end of the light source conduction line being joined to the current output of the operational amplifier, and with the second end of the light source conduction line being joined to the negative current input line;

wherein the operational amplifier is constructed and arranged to compare (i) a reference voltage differential between the positive reference voltage input and the negative reference voltage input of the operational amplifier, to (ii) the voltage differential between the positive current input and the negative current input of the operational amplifier, and to responsively adjust current from the current output of said operational amplifier to the light source conduction line to maintain a selected illumination level from the at least one light source element independent of input voltage across said pair of primary conduction lines.

The above-described strip lighting units and appertaining system may suitably comprise a voltage source such as a battery for maintaining a voltage differential between the pair of primary conduction lines.

The modular strip lighting unit described above may be constructed and arranged so as to be selectively coupleable in series and/or parallel relationship with another modular strip lighting unit.

Another aspect of the invention relates to a multi-module lighting assembly comprising a plurality of modular strip lighting units as above described.

A still further aspect of the invention relates to a method of controlling the current consumption of a current-consuming device with an operational amplifier, comprising establishing a reference voltage for the current-consuming device and inputting the reference voltage to the operational amplifier, sensing the current drawn by the current-consuming device as an operating voltage, and adjusting the voltage across the current-consuming device with the operational amplifier to maintain a predetermined level of current consumption by the current-consuming device.

Other features, aspects and advantages of the present invention will be more fully apparent from the ensuing disclosure and appended claims.

DETAILED DESCRIPTION OF THE INVENTION, AND PREFERRED EMBODIMENTS THEREOF

While the present invention will be described more fully hereinafter with reference to the accompanying drawings, in which particular and illustrative embodiments are shown, it is to be understood at the outset that persons skilled in the art may modify the invention herein described while achieving the functions and results of this invention. Accordingly, the description which follows is to be understood as merely illustrative and exemplary of specific structures, aspects and features within the broad scope of the present invention and not as limiting of the broad scope of the invention.

While the invention is described hereinafter primarily in application to strip lighting systems comprising light emitting diode light source elements, it will be recognized that the applicability of the invention is not thus limited, but rather comprehends other strip lighting systems having other types of light source elements incorporated therein, including incandescent lamps, cold or hot cathode lamps, and electroluminescent phosphor elements.

Figure 1:
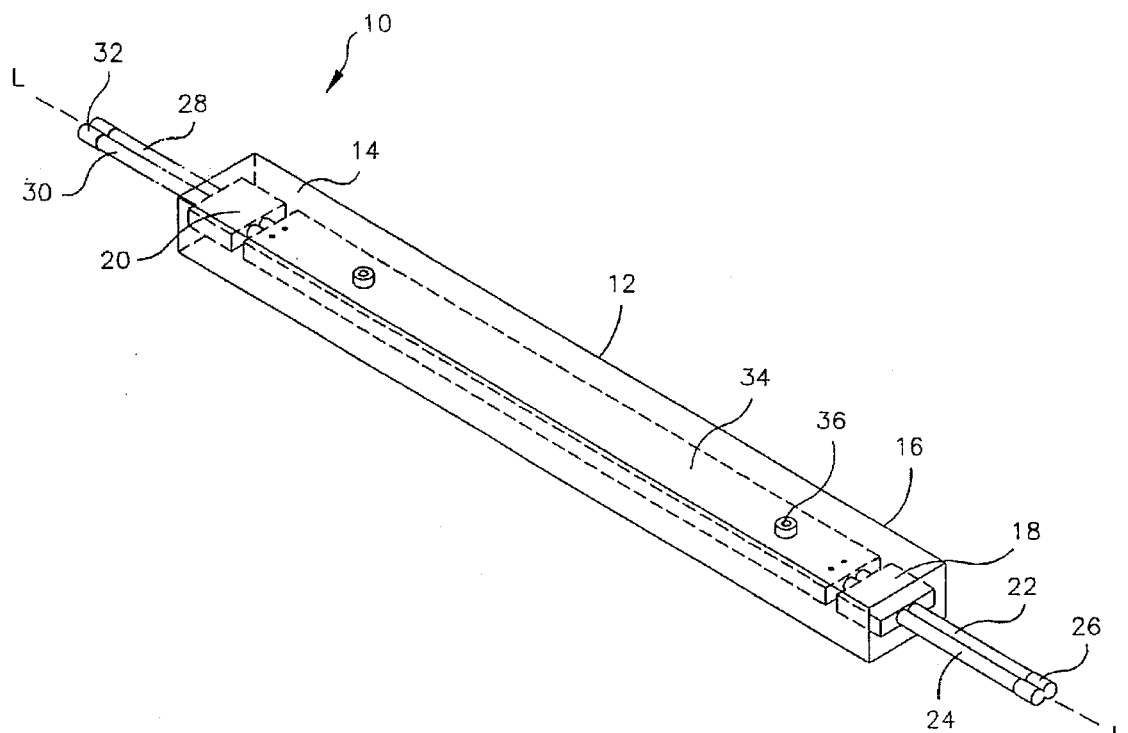
FIG. 1 is a perspective view of a modular strip lighting unit according to one embodiment of the present invention.

FIG. 1 is a perspective view of a modular strip lighting unit 10 according to one embodiment of the present invention. The strip lighting unit 10 includes a housing 12 defining an interior volume therein. In the interior volume of the housing is mounted a printed circuit board 34 comprising circuit means in support of an array of light source elements 36 on the circuit board or other equivalent substrate/support member. Such light source elements may for example comprise light emitting diodes.

The housing 12 may be formed of a suitable light transmissive material, at least in portions of the housing being in light output-transmitting relationship to the lamp or other light source elements.

In the embodiment shown, the housing 12 is of rectangular cross-section (cross-section being a section perpendicular to the longitudinal axis L—L of the housing as shown in FIG. 1, it being understood that the housing may be of any suitable shape and conformation as appropriate and desirable for a given end use application of the strip lighting system comprising such modular unit). It is generally preferred to employ a housing having a rectangular cross-section, to provide a channel-type configuration as shown, for ease of fabrication and installation (such housing may be readily formed with flanges, tabs, detents, integral mechanical fasteners, etc., to facilitate attachment to a recipient structural member or body).

The elongate housing 12 has respective end portions 14 and 16, which are open-ended at the extremeties of the housing. At first end portion 14, a plug or sealing member 20 is sealingly disposed in the end opening of the housing, and in like manner, a plug or sealing member 18 is provided at the second end portion 16 of the housing.

The first end portion sealing member 20 is formed with feedthroughs (openings in the sealing member) accomodating passage therethrough of electrical lead wires 28 and 30. The lead wires are joined at their outer extremities to connector 32, and pass through the sealing member 20 for connection to the circuit board 34 bearing the light source devices 36 thereon. The lead wires thereby provide power supply means for delivery of electrical power to the strip lighting unit when the connector 32 is operatively connected to a source of electrical energy, such as a battery or electrical generator, or a power line or grid.

The second end portion sealing member 18 is correspondingly formed with feedthroughs accomodating the passage therethrough of electrical lead wires 22 and 24, such wires being joined at their outer ends to connector 26. The lead wires 22 and 24 pass through the sealing member 18 and connect to the circuit board 34. These lead wires are in circuit relationship with lead wires 28 and 30, so that the strip lighting unit 10 is thereby connectible to another strip lighting unit as hereinafter more specifically described.

Figure 2:
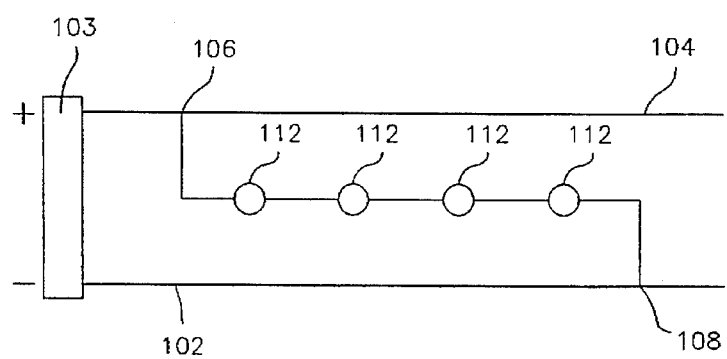
FIG. 2 is a schematic circuit diagram of a modular strip lighting unit comprising an assembly of multiple light sources in series, and positive and negative conduction paths.

FIG. 2 is a schematic circuit diagram of a modular strip lighting unit comprising an assembly of multiple light source elements 112 in series, and negative and positive conduction paths 102 and 104, respectively. A voltage provided by an external source 103, e.g., a battery or a generator, is coupled with the pair of primary conduction lines 102 and 104. Light source elements 112 are aligned in series relationship along a light source conduction line 110. The light source conduction line is connected at its opposite ends 108 and 106 to the negative line 102 and to the positive line. 104, respectively, thereby forming a conduction path for current to flow.

Figure 3:
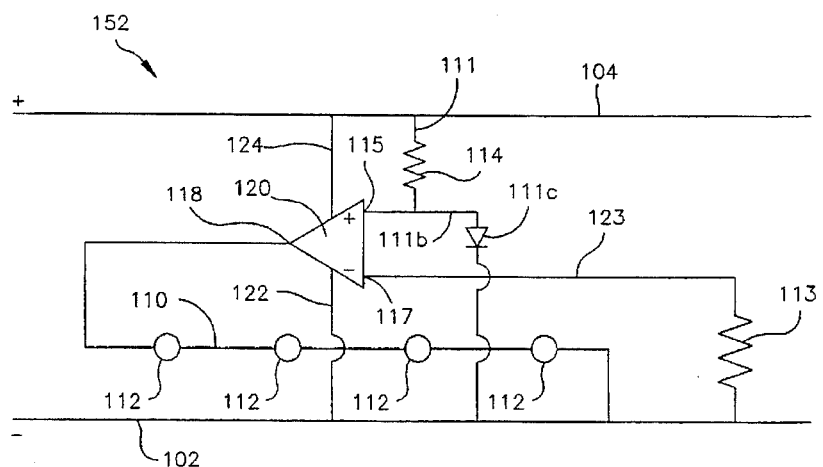
FIG. 3 is a schematic circuit diagram of a modular strip lighting unit comprising an array of multiple light source elements in series, and including an operational amplifier active current regulator.

FIG. 3 is a schematic circuit diagram of a current regulating circuit 152 according to one embodiment of the present invention. A voltage provided by an external voltage source (not shown in FIG. 3; see FIG. 2) is maintained across a negative primary conduction line 102 and a positive primary conduction line 104. An operational amplifier 120 is connected at its positive and negative reference voltage inputs to the negative and positive primary conduction lines 102, 104 by the conduction paths of reference voltage input lines 122 and 124, respectively.

The positive current input terminal 115 of the operational amplifier 120 is connected to the positive primary conduction line 104 by a positive current input line 111 containing a resistor 114. The positive current input line 111 also is joined to line 111b which contains diode 111c and is joined at its opposite end to the negative primary conduction line 102. The current output 118 of the operational amplifier 120 is connected to one end of a light source conduction line 110 having light source elements 112 in series relationship with one another. The opposite end of the light source conduction line 110 is connected to the negative current input line 123. The negative current input line 123 contains resistor 113, and is connected at one end to negative reference current input 117 and at the other end to the negative primary conduction line 102.

In such circuit the reference voltage differential of inputs of lines 122 and 124 is compared by the operational amplifier 120 with the voltage across input current terminals 115 and 117. The comparison causes the amplifier to adjust the output current flow from current output 118 along light source conduction line 110 to a level maintaining a constant level of illumination from light source elements 112, independent of power supply fluctuations in the power being furnished to the lighting system.

In a preferred embodiment of the circuit shown in FIG. 3, the operational amplifier 120 comprises an integrated circuit operational amplifier and the light source elements 112 are light emitting diodes.

Figure 4:
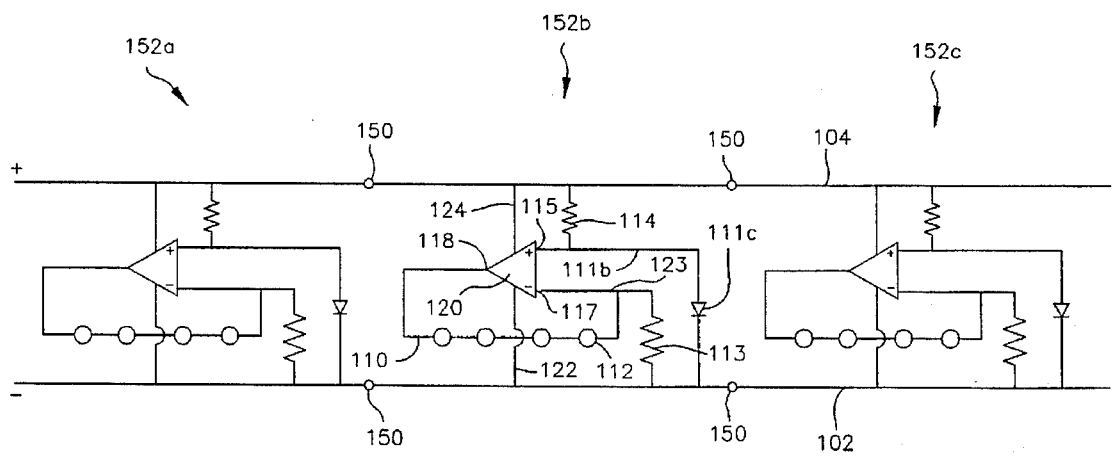
FIG. 4 is a schematic circuit diagram of an interconnected assembly of modular lighting units of the type shown in FIG. 1.

FIG. 4 is a schematic circuit diagram of a modular strip lighting system including a plurality of strip lighting units of the type illustrated in FIG. 3. The electrical conduction paths comprising negative primary conduction line 102 and positive primary conduction line 104 of the serially connected units 152a, 152b, and 152c are connected at junctions 150 to negative and positive primary conduction lines of the adjacently sequential units.

The operational amplifiers in the circuits of each unit enable a user to assemble a plurality of strip lighting units supplied by only one voltage source, without altering the current flowing across the light source elements of each strip lighting unit.

The voltage across the operational amplifier reference voltage terminals (i.e., the terminals connected to the reference voltage input lines 124 and 122 of each of the respective operational amplifiers 120) is unaffected by being in parallel arrangement with other strip lighting units, and the individual operational amplifiers control the current flow for each strip lighting unit.

Thus, short circuit failures of individual light source elements do not affect the current available to other light source elements (either in series within the same strip lighting unit, or in other strip lighting units in parallel).

Figure 5:
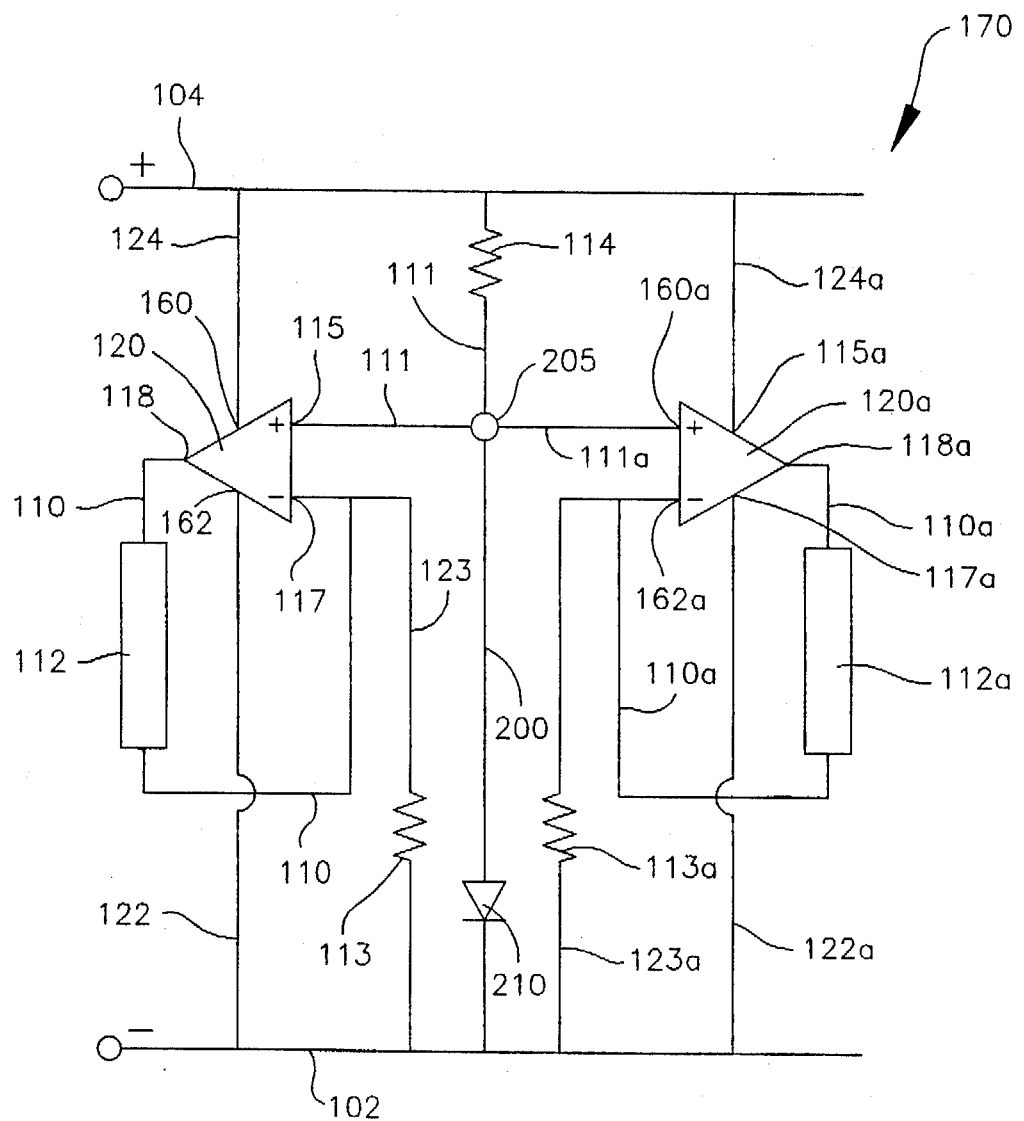
FIG. 5 is a schematic circuit diagram of an LED driver circuit for current draw and brightness control, according to one embodiment of the invention.

FIG. 5 is a schematic circuit diagram of a circuit 170 according to another embodiment of the invention, for light source element brightness/current draw control.

A negative primary conduction line 102 and a positive primary conduction line 104 may be suitably coupled in circuit relationship with a suitable voltage source, e.g., a 16 volt, 24 volt, or 36 volt battery, or other power source. The arrays 112 and 112a are arranged in parallel relationship to one another, each containing for example six LED elements.

An operational amplifier 120 is connected at its negative reference voltage input 162 to the negative primary conduction line 102 by negative reference voltage input line 122. In like manner, the operational amplifier 120 is connected at its positive reference voltage input 160 to the positive primary conduction line 104 by positive reference voltage input line 124.

The positive current input terminal 115 of the operational amplifier 120 is connected to the positive primary conduction line 104 by the positive current input line 111 containing resistor 114 therein. The current output 118 of the operational amplifier 120 is connected by output current conduction line 110 to one end of a light source element array 112. In light source element array 112, the individual light source elements are in series relationship to one another.

The negative current input line 123 has resistor 113 disposed therein. This line is connected at one end to the negative current input terminal 117 of the operational amplifier, while the other end of the negative current input line 123 is joined to the negative primary conduction line 102. The output current conduction line 110 also connects at its end opposite the light source element array 112 with negative current input line 123 having resistor 113 therein, as shown.

The positive current input terminal 115 of the operational amplifier 120 is connected to the positive primary conduction line 104 by a positive current input line 111 containing resistor 114 therein, as shown.

Positive current input line 111 is joined at node 205 with a branch conductive line 200 having forwardly biased (toward the direction of the negative primary conductive line 102) diode 210 therein. The diode 210 preferably is a silicon diode. In the arrangement shown, line 111, containing resistor 114 therein, and branch conductive line 200, having diode 210 therein forwardly biased toward the negative primary conductive line, provide a reference voltage differential for the operational amplifier system.

In the circuit 170 shown in FIG. 5, the circuit is symmetric about the postive current input line 111 and the branch conductive line 200, and such circuit comprises a second operational amplifier 120a including a positive reference voltage input 115a, a negative reference voltage input 117a, a positive current input 160a, a negative current input 162a, and a current output 118a.

A second positive reference voltage input line 124a joins the positive reference voltage input 115a of the second operational amplifier 120a with the positive primary conduction line 104. A second negative reference voltage input line 122a joins the negative reference voltage input 117a of the second operational amplifier 120a with the negative primary conduction line 102. A second negative current input line 123a comprising at least one resistor 113a joins the negative current input 162a of the second operational amplifier 120a to the negative primary conduction line 102. A second positive current input line comprising line 111 having resistor 114 therein and line 111a is connected to the second operational amplifier 120a at the terminus of line 111a opposite the end of line 111a that is connected to node 205.

In the circuit 170, the second output conduction line 110a is coupled to at least one second electric power-consuming element 112a as shown, with a first end of such conduction line 110a being joined to the current output 118a of the second operational amplifier 120a and with a second end of such conduction line 110a being joined to the second negative current input line 123a.

The current consumption control circuit 170 shown in FIG. 5 allows the LEDs in each of the arrays 112 and 112a to be operated in series with uniform brightness over a wide operating range of input voltage. The incorporation of surface-mounted LEDs in the illumination modules 112 and 112a, when the current consumption control circuit 170 is employed in a strip lighting modular unit, provides a low profile illlumination assembly with good visibility angle characteristics.

The current consumption control circuit variously described in illustrative embodiments hereinabove, when implemented in a strip lighting system, represents a significant advance in the art of such strip lighting systems, by enabling uniform brightness (illumination level in the case of visible ligtht output, and electromagnetic flux/intensity in the case of visible as well as other electromagnetic radiation outputs) to be maintained despite (i) fluctuations in the input voltage delivered to the system and/or (ii) failure of individual illumination source elements in the lighting array.

The brightness/control draw circuitry of the present invention enables LEDs as well as other electromagnetic radiation output means to maximize electromagnetic flux/intensity of the output while concurrently minimizing current draw. By such operation, the circuit allows for less expensive power (voltage) source means, e.g., batteries, to be used. The drive circuit of the present invention functions as an active current regulator which drives the electromagnetic radiation output-producing means, and is designed to operate with low voltage drops, thereby allowing a maximum number of LEDs (or other output elements) to be connected to a minimum battery (or other) voltage supply.

The advantage of using an active current regulator as in the circuits illustratively described hereinabove is that LED brightness (electromagnetic radiation output) is constant over a wide range of voltage inputs. This is not possible with voltage controlled systems of the prior art, such as the circuitry and apparatus disclosed in the aforementioned U.S. Pat. No. 5,107,408. Additionally, current consumption is constant from low to high voltages, thus not drawing excess current at high supply voltages. This characteristic significantly improves the efficiency and reliability of the overall system including such circuitry.

As an example of the foregoing advantages, and with reference to the specific circuit shown in FIG. 5, it has been found that the use of six-LED arrays 112 and 112a in such circuit is highly efficient with a 24 volt (DC) battery. This characteristic allows operation at low battery voltages without diminshing light output. The numbers of LEDs in the arrays 112 and 112a may be widely varied in the broad practice of the present invention, as may the voltage level supplied by the battery (e.g., 16 volt or 36 volt batteries) or other voltage supply serving the circuit.

Implementation of the current regulator/LED system shown in the illustrative embodiment of FIGS. 3–5 may be facilitated by the use of an integrated circuit operational amplifier chip providing the circuitry necessary to control the LED current. The current in such embodiment is sensed as a voltage and then compared to a reference voltage (fixed or adjustable in character). The operational amplifier then adjusts the voltage across the LED or LEDs until the set operating current is achieved. In the embodiment shown in FIG. 5, the reference voltage is suitably derived from the forward voltage drop of the silicon diode 210. Such voltage is stable and repeatable. Other voltage regulation circuits could alternatively be employed, within the broad scope of the present invention.

When the operational amplifier power supply voltage is provided by a battery in the practice of the invention, the operational amplifier must be rated for a voltage sufficiently high to accomodate the charging voltage without adverse effect. When at such high charging voltage, the amplifier desirably is coupled to a sufficiently large silicon chip to dissipate the power developed in the charging operation, without overheating.

Although the invention has been illustratively described herein with reference to various exemplary embodiments, aspects, and features, it will be recognized that the invention is not thus limited, and that the invention contemplates other variations, modifications, and embodiments, and accordingly that the invention is to be broadlly construed to encompass all such additional variations, modifications, and other embodiments, within the spirit and scope of the invention as claimed.

What is claimed is:

1. A current consumption control circuit for controlling the current consumption of an electrical power-consuming device in an electrically powered system including at least one pair of primary conduction lines connectable to a voltage source for maintaining a voltage differential between said at least one pair of primary conduction lines, one line of said at least one pair of primary conduction lines therein being a positive primary conduction line and the other line of said at least one pair of primary conduction lines being a negative primary conduction line, with the positive primary conduction line and the negative primary conduction line being coupled in electrical circuit relationship to the current consumption control circuit, said current consumption control circuit comprising:

an operational amplifier including a positive reference voltage input, a negative reference voltage input, a positive current input, a negative current input, and a current output;

a positive reference voltage input line joining the positive reference voltage input of the operational amplifier with the positive primary conduction line;

a negative reference voltage input line joining the negative reference voltage input of the operational amplifier with the negative primary conduction line;

a positive current input line comprising at least one resistor and joining the positive current input of the operational amplifier to the positive primary conduction line;

a negative current input line comprising at least one resistor and joining the negative current input of the operational amplifier to the negative primary conduction line, and at least one output conduction line having, in series, at least one electric power-consuming device and having first and second ends, with the first end of the output conduction line being joined to the current output of the operational amplifier, and with the second end of the output conduction line being joined to the negative current input line such that the at least one electric power-consuming device has first and second ends and is disposed in series between the current output and the negative current input by having its first end connected to said current output and its second end connected to said negative current input;

wherein the operational amplifier is constructed and arranged to compare (i) a reference voltage differential between the positive reference voltage input and the negative reference voltage input of the operational amplifier, to (ii) the voltage differential between the positive current input and the negative current input of the operational amplifier, and to responsively adjust current from the current output of said operational amplifier to the output conduction line having the first end of said at least one electric power-consuming device connected thereto so as to maintain a selected current consumption level from the at least one electric power-consuming device independent of input voltage across the pair of primary conduction lines; and whereby voltage across the operational amplifier reference voltage inputs of the current consumption control circuit and the current consumption of the electric power-consuming device are unaffected by short-circuit failure of other electric power-consuming devices arranged in series therewith in the circuit or by short-circuit failure of other current consumption control circuits in parallel therewith.

2. A current consumption control circuit for controlling the current consumption of an electrical power-consuming device in an electrically powered system including at least one pair of primary conduction lines connectable to a voltage source for maintaining a voltage differential between said at least one pair of primary conduction lines, one line of said at least one pair of primary conduction lines therein being a positive primary conduction line and the other line of said at least one pair of primary conduction lines being a negative primary conduction line, with the positive primary conduction line and the negative primary conduction line being coupled in electrical circuit relationship to the current consumption control circuit, said current consumption control circuit comprising:

an operational amplifier including a positive reference voltage input, a negative reference voltage input, a positive current input, a negative current input, and a current output;

a positive reference voltage input line joining the positive reference voltage input of the operational amplifier with the positive primary conduction line;

a negative reference voltage input line joining the negative reference voltage input of the operational amplifier with the negative primary conduction line;

a positive current input line comprising at least one resistor and joining the positive current input of the operational amplifier to the positive primary conduction line, said positive current input line being coupled to the negative primary conductive line by a branch conductive line with a diode therein, wherein the diode is forwardly biased toward the negative primary conductive line, to provide a reference voltage differential;

a negative current input line comprising at least one resistor and joining the negative current input of the operational amplifier to the negative primary conduction line, and at least one output conduction line having in series, at least one electric power-consuming device and having first and second ends, with the first end of the output conduction line being joined to the current output of the operational amplifier, and with the second end of the output conduction line bring joined to the negative current input line such that the at least one electric power-consuming device is disposed in series between the current output and the negative current input;

wherein the operational amplifier is constructed and arranged to compare (i) said reference voltage differential between the positive reference voltage input and the negative reference voltage input of the operational amplifier, to (ii) the voltage differential between the positive current input and the negative current input of the operational amplifier, and to responsively adjust current from the current output of said operational amplifier to the output conduction line to maintain a selected current consumption level from the at least one electric power-consuming device independent of input voltage across the pair of primary conduction lines; and whereby voltage across the operational amplifier reference voltage inputs of the current consumption control circuit and the current consumption of rite electric power-consuming device are unaffected by short-circuit failure of other electric power-consuming devices arranged in series therewith in the circuit or by short-circuit failure of other current consumption control circuits in parallel therewith.

3. A current consumption control circuit according to claim 2, wherein the diode comprises a silicon diode.

4. A current consumption control circuit according to claim 2, which is symmetric about the postive current input line and the branch conductive line, comprising a second operational amplifier including a positive reference voltage input, a negative reference voltage input, a positive current input, a negative current input, and a current output, a second positive reference voltage input line joining the positive reference voltage input of the second operational amplifier with the positive primary conduction line, a second negative reference voltage input line joining the negative reference voltage input of the second operational amplifier with the negative primary conduction line, a second negative current input line comprising at least one resistor and joining the negative current input of the second operational amplifier to the negative primary conduction line, and at least one second output conduction line coupled to at least one second electric power-consuming element and having first and second ends, with the first end of the second output conduction line being joined to the current output of the second operational amplifier, and with the second end of the second output conduction line being joined to the second negative current input line.

5. A current consumption control circuit according to claim 2, wherein an integrated circuit operational amplifier chip comprises the operational amplifier.

6. A current consumption control circuit according to claim 2, further comprising a voltage source.

7. A current consumption control circuit according to claim 6, wherein the voltage source comprises a battery.

8. A modular strip lighting unit constructed and arranged the use in a lighting system which includes at least one said modular strip lighting unit, said modular strip lighting unit including at least one light source element operatively coupled to a lighting circuit, with said lighting circuit comprising:

at least one pair of primary conduction lines connectable to a voltage source for maintaining a voltage differential between said at least one pair of primary conduction lines, one line of said at least one pair of primary conduction lines therein being a positive primary conduction line and the other line of said at least one pair of primary conduction lines being a negative primary conduction line, with the positive primary conduction line and the negative primary conduction line being coupled in electrical circuit relationship to a current regulating circuit;

said current regulating circuit comprising:

an operational amplifier including a positive reference voltage input, a negative reference voltage input, a positive current input, a negative current input, and a current output;

a positive reference voltage input line joining the positive reference voltage input of file operational amplifier with the positive primary conduction line;

a negative reference voltage input line joining the negative reference voltage input of the operational amplifier with the negative primary conduction line;

a positive current input line comprising at least one resistor and joining the positive current input of the operational amplifier to the positive primary conduction line;

a negative current input line comprising at least one resistor and joining the negative current input of the operational amplifier to the negative primary conduction line, and at least one light source conduction line having, in series, at least one light source element and having first and second ends, with the first end of the at least one light source conduction line being joined to the current output of the operational amplifier, and with the second end of the at least one light source conduction line being joined to the negative current input line such that the at least one light source element has first and second ends and is disposed in series between the current output and the negative current input by having its first end connected to said current output and its second end connected to said negative current input;

wherein the operational amplifier is constructed and arranged to compare (i) a reference voltage differential between the positive reference voltage input and the negative reference voltage input of the operational amplifier, to (ii) the voltage differential between the positive current input and the negative current input of the operational amplifier, end to responsively adjust current from the current output of said operational amplifier to said at least one light source conduction line having the first end of said at least one light source element connected thereto so as to maintain a selected illumination level from said at least one light source element independent of input voltage across said pair of primary conduction lines; and whereby voltage across the operational amplifier reference voltage inputs, of the current consumption control circuit and the current consumption of the at least one light source element are unaffected by short-circuit failure of other light source elements arranged in series therewith in the circuit or by short-circuit failure of other current consumption control circuits in parallel therewith.

9. A modular strip lighting unit constructed and arranged for use in a lighting system which includes at least one said modular strip lighting unit, said modular strip lighting unit including at least one light source element operatively coupled to a lighting circuit, with said light circuit comprising:

at least one pair of primary conduction lines connectable to a voltage source for maintaining a voltage differential between said at least one pair of primary conduction lines, one line of said at least one pair of primary conduction lines therein being a positive primary conduction line and the other line of said at least one pair of primary conduction lines being a negative primary conduction line, with the positive primary conduction line and the negative primary conduction line being coupled in electrical circuit relationship to a current regulating circuit;

said current regulating circuit comprising:

an operational amplifier including a positive reference voltage input, a negative reference voltage input, a positive current input, a negative current input, and a current output;

a positive reference voltage input line joining the positive reference voltage input of the operational amplifier with the positive primary conduction line;

a negative reference voltage input line joining the negative reference voltage input of the operational amplifier with the negative primary conduction line;

a positive current input line comprising at least one resistor and joining the positive current input of the operational amplifier to the positive primary conduction line, said positive current input line being coupled to the negative primary conductive line by a branch conductive line with a diode therein, wherein the diode is forwardly biased toward the negative primary conductive line, to provide a reference voltage differential;

a negative current input line comprising at least one resistor and joining the negative current input of the operational amplifier to the negative primary conduction line, and at least one light source conduction line having, in series, at least one light source element and having first and second ends, with the first end of the at least one light source conduction line being joined to the current output of the operational amplifier, and with the second end of the at least one light source conduction line being joined to negative current input line such that the at least one light source element is disposed in series between the current output and the negative current input;

wherein the operational amplifier is constructed and arranged to compare (i) said reference voltage differential between the positive reference voltage input and the negative reference voltage input of the operational amplifier, to (ii) the voltage differential between the positive current input and the negative current input of the operational amplifier, and to responsively adjust current from the current output of said operational amplifier to said at least one light source conduction line to maintain a selected illumination level from said at least one light source element independent of input voltage across said pair of primary conduction lines; and whereby voltage across the operational amplifier reference voltage inputs of the current consumption control circuit and the current consumption of the light source element are unaffected by short-circuit failure of other light source elements arranged in series therewith in the circuit or by short-circuit failure of other current consumption control circuits in parallel therewith.

10. A modular strip lighting unit according to claim 9, wherein the diode comprises a silicon diode.

11. A modular strip lighting unit according to claim 9, further comprising at least one second light source element, and wherein said current regulating circuit is symmetric about the postive current input line and the branch conductive line, comprising a second operational amplifier including a positive reference voltage input, a negative reference voltage input, a positive current input, a negative current input, and a current output, a second positive reference voltage input line joining the positive reference voltage input of the second operational amplifier with the positive primary conduction line, a second negative reference voltage input line joining the negative reference voltage input of the second operational amplifier with the negative primary conduction line, a second negative current input line comprising at least one resistor and joining the negative current input of the second operational amplifier to the negative primary conduction line, and at least one second output conduction line coupled to at least one second light source element and having first and second ends, with the first end of the second output conduction line being joined to the current output of the second operational amplifier, and with the second end of the second output conduction line being joined to the second negative current input line.

12. A modular strip lighting unit according to claim 9, wherein an integrated circuit operational amplifier chip comprises the operational amplifier.

13. A modular strip lighting unit according to claim 9, further comprising a voltage source.

14. A modular strip lighting unit according to claim 13, wherein the voltage source comprises a battery.

15. A modular strip lighting unit according to claim 9, wherein said pair of primary conduction lines is constructed and arranged to be selectively coupleable in series or parallel relationship with another modular strip lighting unit.

16. A modular strip lighting unit according to claim 9, wherein the at least one light source element is selected from the group consisting of light emitting diodes, incandescent lamps, cold cathode lamps, hot cathode lamps, electroluminescent phosphor elements, and combinations thereof.

17. A modular strip lighting unit according to claim 9, wherein said at least one light source element comprises at least one light emitting diode.

18. A modular strip lighting unit according to claim 9, wherein said at least one light source element comprises a multiplicity of light emitting diodes in series relationship with one another.

19. A modular strip lighting unit according to claim 9, comprising an electroluminescent lamp including a layer of electroluminescent phosphor material fixedly positioned by a polymer binder between two conductive layers at least one of which is transparent, said electroluminescent lamp being operable by application of an alternating electric field across the conductive layers to cause the electroluminescent phosphor material to become excited and emit electrons in the visible light spectrum.

20. A modular strip lighting unit according to claim 9, comprising an elongate casing, wherein said at least one light source element comprises a sequence of spaced-apart light emitting sources, with the modular strip lighting unit being interconnectable with other modular strip lighting units, in series or parallel relationship, to form multi-unit extended lighting system assemblies for illumination of a specific environment.

21. A multi-module strip lighting assembly, comprising a plurality of modular strip lighting units each of which is interconnected with at least one other modular strip lighting unit in the assembly, and wherein each of said modular strip lighting units includes at least one light source element operatively coupled to a lighting circuit, with said lighting circuit comprising:

at least one pair of primary conduction lines connectable to a voltage source for maintaining a voltage differential between said at least one pair of primary conduction lines, one line of said at least one pair of primary conduction lines therein being a positive primary conduction line and the other line of said at least one pair of primary conduction lines being a negative primary conduction line, with the positive primary conduction line and the negative primary conduction line being coupled in electrical circuit relationship to a current regulating circuit;

said current regulating circuit comprising:

an operational amplifier including a positive reference voltage input, a negative reference voltage input, a positive current input, a negative current input, and a current output;

a positive reference voltage input line joining the positive reference voltage input of the operational amplifier with the positive primary conduction line;

a negative reference voltage input line joining the negative reference voltage input of the operational amplifier with the negative primary conduction line;

a positive current input line comprising at least one resistor and joining the positive current input of the operational amplifier to the positive primary conduction line;

a negative current input line comprising at least one resistor and joining the negative current input of the operational amplifier to the negative primary conduction line, and at least one light source conduction line having, in series, at least one light source clement and having first and second ends, with the first end of the at least one light source conduction line being joined to the current output of the operational amplifier, and with the second end of the at least one light source conduction line being joined to the negative current input line such that the at least one light source element has first and second ends and is disposed in series between the current output and the negative current input by having its first end connected to said current output and its second end connected to said negative current input;

wherein the operational amplifier is constructed and arranged to compare (i) a reference voltage differential between the positive reference voltage input and the negative reference voltage input of the operational amplifier, to (ii) the voltage differential between the positive current input and the negative current input of the operational amplifier, and to responsively adjust current from the current output of said operation amplifier to said light source conduction line having the first end of said at least one light source element connected thereto so as to maintain a selected illumination level from said at least one light source element independent of input voltage across said pair of primary conduction lines; and whereby voltage across the operational amplifier reference voltage inputs of the current consumption control circuit and the current consumption of the light source element are unaffected by short-circuit failure of other light source elements arranged in series therewith in the circuit or by short-circuit failure of other current consumption control circuits in parallel therewith.

22. A method of controlling the current consumption of a plurality of current-consuming devices each having first and second ends which are arranged in series by means of an operational amplifier comprising:

establishing a reference voltage and inputting same across reference voltage inputs of the operational amplifier;

inputting a reference current at a positive current input of said operational amplifier;

coupling said first end of said series of current-consuming devices to an output of said operational amplifier; and coupling said second end of said series of current-consuming devices to a negative current input of said operational amplifier, such that the current across the current consuming devices is maintained at a predetermined level; and whereby voltage across the operational amplifier reference voltage inputs and the current consumption of the electric power-consuming device are unaffected by short-circuit failure of other electric power-consuming devices arranged in series therewith or by short-circuit failure of other current consumption control circuits in parallel therewith.

23. A method according to claim 22, wherein the current-consuming device comprises an illumination element.

24. A method according to claim 22, wherein the current-consuming device comprises at least one light-emitting diode.

* * * * *

UNITED STATES PATENT AND TRADEMARK OFFICE
CERTIFICATE OF CORRECTION

PATENT NO. : 5,661,374
DATED : August 26, 1997
INVENTOR(S) : Cassidy, et al.

It is certified that error appears in the above-indentified patent and that said Letters Patent is hereby corrected as shown below:

Column 4, Line 16    delete "dement" and insert --element--
Column 7, Line 22    delete the "·" following "line"
Column 8, Line 27    change "The" to read --The LED--
Column 12, Line 40    delete "rite" and insert --the--
Column 13, Line 65    delete "end" and insert --and--

Signed and Sealed this

Eighteenth Day of November 1997

Attest:

BRUCE LEHMAN

*Attesting Officer*    *Commissioner of Patents and Trademarks*